US012770271B2

(12) United States Patent
Feng et al.

(10) Patent No.: US 12,770,271 B2
(45) Date of Patent: Oct. 20, 2026

(54) CONTRASTIVE LOSS BASED TRAINING STRATEGY FOR UNSUPERVISED MULTI-OBJECT TRACKING

(71) Applicant: CHONGQING UNIVERSITY OF TECHNOLOGY, Chongqing (CN)

(72) Inventors: Xin Feng, Chongqing (CN); Ling Lu, Chongqing (CN); Yumei Shan, Chongqing (CN); Di Ming, Ming (CN); Fang Yue, Chongqing (CN); Wu Yang, Chongqing (CN); Jianwu Long, Chongqing (CN)

( * ) Notice: Subject to any disclaimer, the term of this patent is extended or adjusted under 35 U.S.C. 154(b) by 224 days.

(21) Appl. No.: 18/677,886

(22) Filed: May 30, 2024

(65) Prior Publication Data

US 2024/0404077 A1 Dec. 5, 2024

(30) Foreign Application Priority Data

May 31, 2023 (CN) ......................... 202310631895.8

(51) Int. Cl.
*G06T 7/20* (2017.01)

(52) U.S. Cl.
CPC ...... *G06T 7/20* (2013.01); *G06T 2207/10016* (2013.01); *G06T 2207/20081* (2013.01)

(58) Field of Classification Search
CPC . G06T 2207/10016; G06T 2207/20081; G06T 2207/20084; G06T 7/20; G06T 7/246; G06T 7/248; G06T 7/251
USPC .......................................................... 382/100
See application file for complete search history.

(56) References Cited

U.S. PATENT DOCUMENTS

| | | | | |
|---|---|---|---|---|
| 12,400,341 B2 * | 8/2025 | Fu | ............................. | G06T 7/11 |
| 2022/0180117 A1 * | 6/2022 | Chiu | ....................... | G06F 18/22 |
| 2022/0391621 A1 * | 12/2022 | Chen | ......................... | G06T 7/20 |

(Continued)

FOREIGN PATENT DOCUMENTS

KR 102763536 B1 * 2/2025 ............. G06N 20/00

OTHER PUBLICATIONS

Wang, Huanhuan, et al. "Detector-tracker integration framework for autonomous vehicles pedestrian tracking." Remote Sensing 15.8 (2023): 2088. (Year: 2023).*

*Primary Examiner* — Chineyere Wills-Burns
*Assistant Examiner* — Emmanuel Silva-Avina

(57) ABSTRACT

The present invention relates to unsupervised tracking technology, specifically an unsupervised tracking model training strategy based on contrastive loss. The method comprises: S1: forming a constrained SSCI module using the relation between objects within a video frame and between adjacent video frames; S2: setting features of different objects in each frame as negative samples, and similar adjacent frame objects as positive sample pairs, constructing contrastive loss; S3: constraining embedded features (E_t) by variable loss based on self-supervised contrastive loss. This invention provides a contrastive loss-based training strategy for unsupervised multi-object tracking, leveraging the prior that objects in a frame must be different to enhance object similarity, and using self-supervised learning to match similar objects in short-interval frames as positive samples to boost cross-frame feature expression. Finally, it further improves cross-frame feature expression by ensuring consistent forward and reverse matching.

7 Claims, 11 Drawing Sheets

(56) References Cited

U.S. PATENT DOCUMENTS

| | | | | |
|---|---|---|---|---|
| 2024/0144489 | A1* | 5/2024 | Nguyen .................. | G06T 7/248 |
| 2025/0086974 | A1* | 3/2025 | Fukui ..................... | G06V 10/82 |

* cited by examiner (c)FairMOT

CONTRASTIVE LOSS BASED TRAINING STRATEGY FOR UNSUPERVISED MULTI-OBJECT TRACKING

TECHNICAL FIELD

The present invention relates to the field of unsupervised tracking technology, in particular to a contrastive loss based training strategy for unsupervised multi-object tracking.

BACKGROUND ART

The mainstream multi-object tracking algorithms are implemented by object detection and representation vector extraction. In order to improve the tracking effect, researchers first proposed to use an additional appearance feature extractor to increase the available information when the frames before and after the tracking task are associated, but the use of multiple models makes it difficult for the model to meet real-time performance. In order to meet the real-time requirements, researchers have proposed a multi-object tracking model based on the Joint Detection and Embedding (JDE) paradigm. However, no matter what kind of approach, it requires extremely labor-intensive trajectory annotation as long as the tracking strategy uses the correlation information of the previous frame and the subsequent frame objects;

The existing methods treat embedding training as classification, which will bring some new problems. They classify each trajectory in the dataset as a category and constrain the embedded branch by classifying the features obtained by the embedded branch. This training strategy can achieve good effects when the number of trajectories is not large, but if the number of trajectories is too large, the model will be difficult to fit (the number of outputs of the fully connected layer is proportional to the number of trajectories), and the length of the trajectories in the dataset is inconsistent that results in an imbalance in the number of samples in each category, which will limit the performance of the JDE paradigm tracker. Meanwhile, the JDE paradigm uses a common backbone network to extract unified features for multiple tasks, but there is a certain conflict between sub-tasks, which leads to the lack of effect of the JDE paradigm model.

Therefore, we design a contrastive loss based training strategy for unsupervised multi-object tracking to provide another technical solution for the above technical problems.

SUMMARY

Based on this, it is necessary to provide a contrastive loss based training strategy for unsupervised multi-object tracking to solve the technical problems proposed in the above background technology.

In order to solve the above technical problems, the present invention adopts the following technical scheme:

a contrastive loss based training strategy for unsupervised multi-object tracking, the steps being as follows:

S1: forming a constrained SSCI module by using a relation between an interior of a video frame and a relation between adjacent video frame targets;

S2: mutually setting as negative samples according to the features of different targets in each frame of an image, setting adjacent frame targets with similar adjacent frames as positive sample pairs, and constructing contrastive loss;

S3: constraining an embedded feature $\hat{E}_t$ by variable loss based on self-supervised contrastive loss;

S4: enhancing a cross-frame expression ability of features by forward matching and reverse matching;

S5: verifying a tracking accuracy by a MOT Challenge dataset.

As a preferred embodiment of the contrastive loss based training strategy for unsupervised multi-object tracking provided by the present invention, an SSCI module is calculated according to the following:

the objects within the same frame must not be the same;

the objects of adjacent frames can be matched pairs with higher correctness based on the embedded features.

As a preferred embodiment of the contrastive loss based training strategy for unsupervised multi-object tracking provided by the present invention, the positive sample pair is constructed by adjacent frame targets, and the steps are as follows:

using two consecutive frames to form a short sub-video segment as the model input, and at this time, data of each sub-video segment can be expressed as $$\{I, B\}_{i=1}^{\{t,t+1\}}.$$

As a preferred embodiment of the contrastive loss based training strategy for unsupervised multi-object tracking provided by the present invention, after inputting these sub-videos into a network, the corresponding feature vectors $\hat{E}_t=\{x_1, x_2 \ldots x_{k_t}\}$ and $\hat{E}_{t+1}=\{x_1, x_2 \ldots x_{k_{t+1}}\}$ can be obtained according to the detection annotations of the frame t and frame t+1;

where x denotes a feature vector of a corresponding object, and $k_t$ and $k_{t+1}$ denote a number of objects in the frame image respectively.

As a preferred embodiment of the contrastive loss based training strategy for unsupervised multi-object tracking provided by the present invention, the cross-frame expression ability of features is enhanced by forward matching and reverse matching, and the steps are as follows:

matrix M is divided into four sub-matrices: $M_{t,t}$ and $M_{t+1,t+1}$ and $M_{t,t}$ and $M_{t+1,t+1}$;

$M_{t,t}$ and $M_{t+1,t+1}$ denote a similarity between objects in frame t and frame t+1 respectively; the $M_{t,t+1}$ and $M_{t+1,t}$ denote a similarity between objects in frames t and t+1;

SSCI uses the Hungarian algorithm in $M_{t,t+1}$ as the forward matching of the frames t object to the frame t+1 object to obtain a matching pair of the same object in the adjacent frames;

a loss function $L_{cycle}$ acts on the elements in $M_{t+1,t}$, and uses the forward matching pairs as the reverse matching pair.

As a preferred embodiment of the contrastive loss based training strategy for unsupervised multi-object tracking provided by the present invention, the MOT Challenge comprises MOT17 and MOT20;

the MOT17 dataset comprises a training set and a testing set, the training set contains 5316 frames of images from 7 videos, and the testing set also contains 7 videos and a total of 5919 frames;

the MOT20 dataset comprises a training set and a testing set, the training set accounts for 4 videos and 8931 frames of images, and the testing set accounts for 4 videos and 4479 frames of images.

As a preferred embodiment of the contrastive loss based training strategy for unsupervised multi-object tracking provided by the present invention, a ratio of the training set and the testing set in the MOT17 is 5:5.

There is no doubt that through the above technical solutions of this application, the technical problems to be solved in this application can be solved.

Meanwhile, the present invention has at least the following beneficial effects through the above technical scheme:

the present invention provides a contrastive loss based training strategy for unsupervised multi-object tracking, which relies on the prior that the objects in the frame must be different to push the similarity between the objects; then inspired by the self-supervised learning method, the similar objects between two short-interval frames are matched as positive sample pairs to enhance the cross-frame expression ability of the features; finally, the cross-frame expression ability of the feature is further enhanced according to the prior that the forward and reverse matching must be consistent.

BRIEF DESCRIPTION OF THE DRAWINGS

To explain the technical scheme of the embodiment of the present invention more clearly, a brief introduction will be made to the accompanying drawings used in the embodiments or the description. It is obvious that the drawings in the description below are only some embodiments of the present disclosure, and those ordinarily skilled in the art can obtain other drawings according to these drawings without creative work.

FIG. 3(*b*) depicts the triplet loss function, which pulls one positive sample closer and pushes one negative sample away at a time, and FIG. 3(*c*) illustrates that the contrastive loss function, unlike the triplet loss, does not require determining the specific category of each feature, thereby offering the flexibility inherent in the triplet loss;

DETAILED DESCRIPTION OF THE EMBODIMENTS

Figure 1:
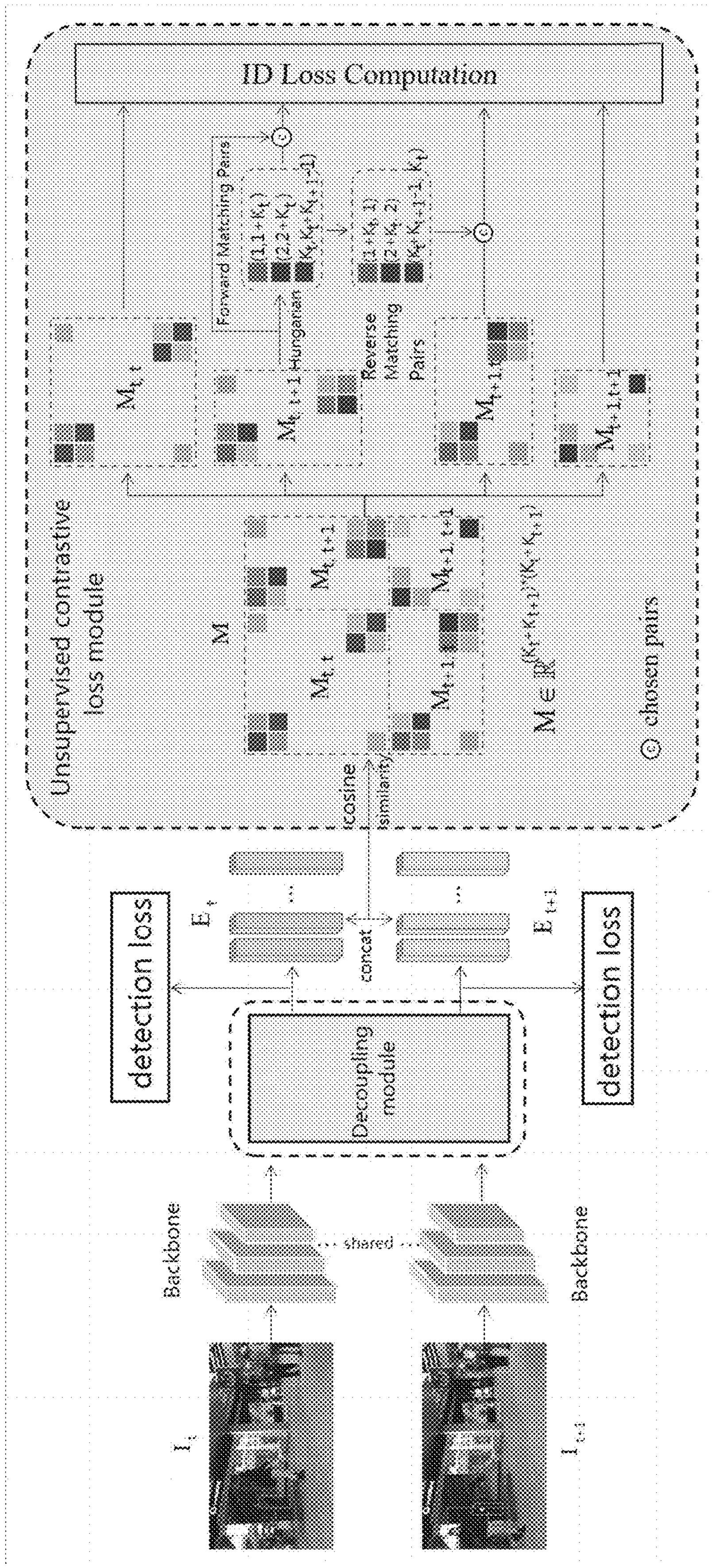
FIG. 1 is a schematic diagram of an unsupervised contrastive learning training framework of the present invention.
Figure 2:
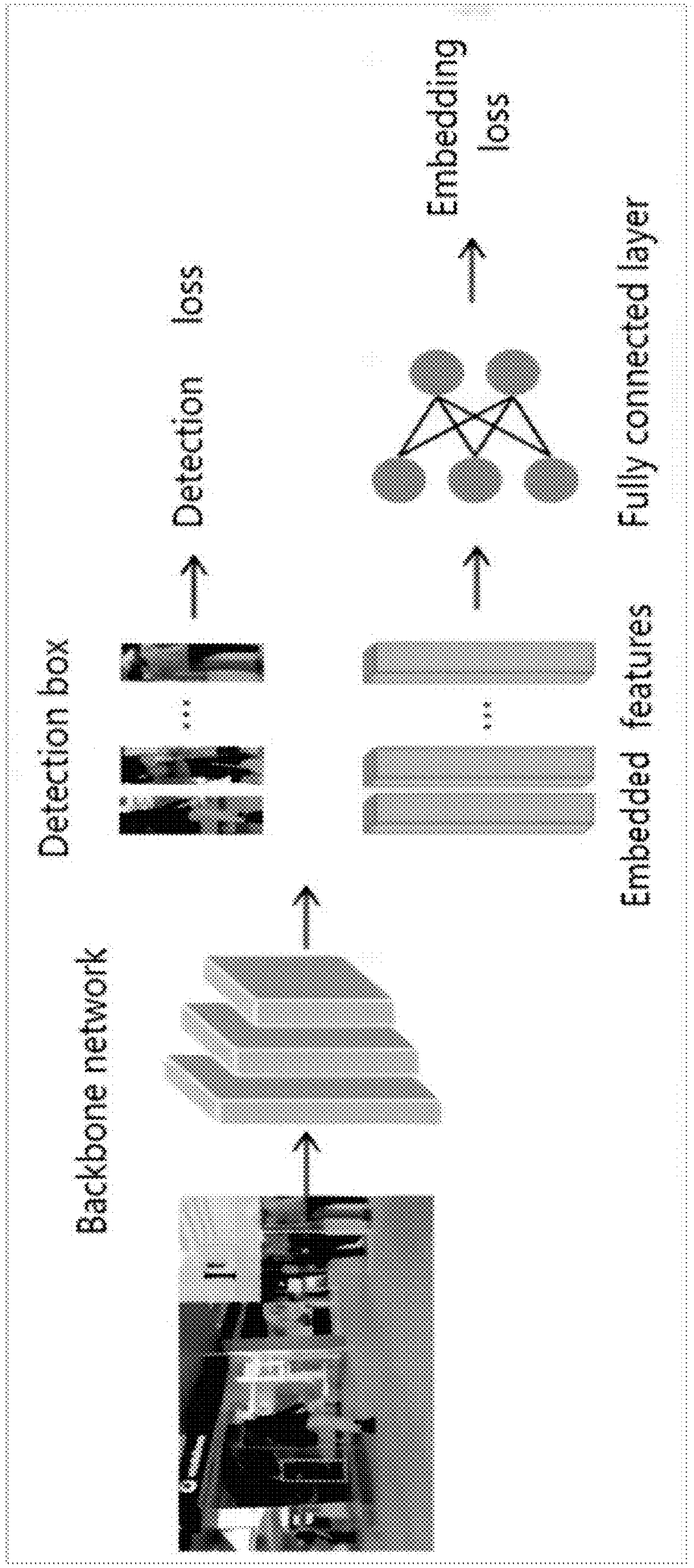
FIG. 2 is a schematic diagram of a JDE tracker supervisory training framework of the present invention.

In order to make the objective, technical solution, and advantages of the present invention clearer and more specific, the present invention will be further described in detail below with reference to accompanying drawings and embodiments. It should be understood that the specific embodiments described herein are merely illustrative of the present invention and are not intended to limit the present invention.

In order to make the personnel in the technical field better understand the scheme of the present invention, the following will describe the technical scheme in the embodiment of the present invention clearly and completely in combination with the accompanying drawings.

It should be noted that in the case of no conflict, the embodiments in the present invention and the characteristics and technical schemes in the embodiment can be combined with each other.

It should be noted that similar annotations and letters denote similar items in the following accompanying drawings, therefore, once an item is defined in a figure, it does not need to be further defined and explained in the subsequent figure.

With reference to FIGS. 1-9, a contrastive loss based training strategy for unsupervised multi-object tracking is as follows:

through the SSCI (Self-Supervised Contrastive ID) loss module to achieve unsupervised training; SSCI constructs the constraint on the embedded branch only based on the association between the short-term objects such as the interior of video frames and adjacent video frames; SSCI proposes two key prior information according to the inherent relationship between the video frame and the adjacent frame object:

1) the objects within the same frame must not be the same;
2) the objects of adjacent frames can be matched pairs with higher correctness based on the embedded features (even if the parameters of the embedded branch are randomly initialized).

The positive and negative sample pairs required for the contrastive loss can be obtained from two priors, that is, the matching pairs obtained by prior 2) are viewed as the positive sample pairs in the contrastive learning, and the embedded features of other objects are taken as negative samples, so as to realize the self-supervised training of the embedding branch.

The JDE tracker will have a dataset denoted as $$\{I, B, y\}_{t=1}^{N}$$

during supervised training, where $I_t \in R_{c*h\times w}$ denotes a frame image, $B_t \in R^{k_t*4}$ denotes the position of $k_t$ objects in the current frame image, and $y_t \in Z^{k_t}$ denotes the trajectory number of the $k_t$ objects in the current frame. These JDE trackers will predict the object position $\hat{B}_t \in R^{\hat{k}_t*4}$ and the embedded features $\hat{E}_t \in R^{\hat{k}_t*D}$ (D denotes the dimension of the feature vector) in a single forward propagation output, and the loss of the JDE tracker is shown in Equation 1:

$$L_{JDE} = L_{DETECTION} + L_{ID} \tag{1}$$

Where $L_{DETECTION}$ is the detection loss determined by the gap between $\hat{B}$ and $\hat{B}_t$, and $L_{ID}$ is the loss of the embedded branch. The embedded features $\hat{E}$ will be input into a fully connected layer used only in training for classification, and $\hat{y}_t \in Z^{\hat{k}_t}$ is obtained, and finally $L_{ID}$ is obtained by calculating the cross-entropy loss $\hat{y}_t$ and $y_t$.

Figure 3:
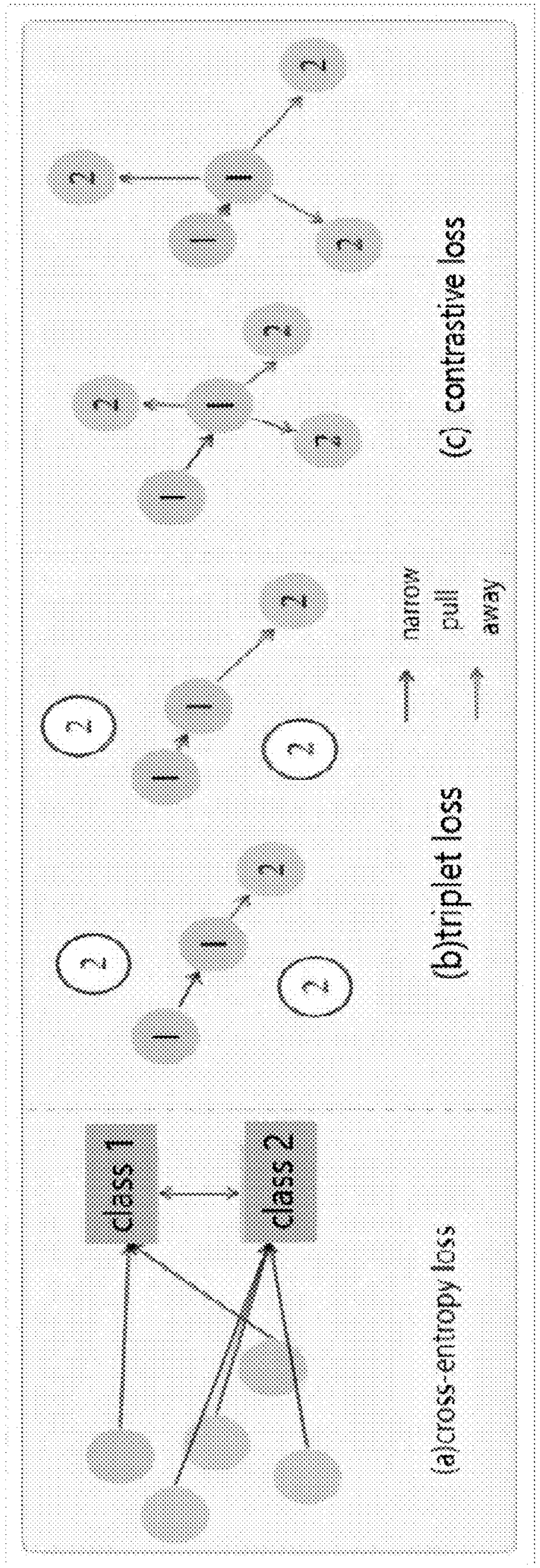
FIG. 3 is a schematic diagram illustrating the common loss functions used in representation learning in accordance with the present invention, wherein FIG. 3(*a*) shows that the cross-entropy loss function requires pre-classification of features, grouping similar features in adjacent feature spaces, while simultaneously separating the feature centers of different categories.

1. Common Loss of Representation Learning the three most common characterization losses are cross-entropy loss, triplet loss and contrastive loss. The relative constraint purpose is shown in FIG. 3. The calculation equation of cross-entropy loss is shown in Equation 2:

$$L_{CE} = -\frac{1}{n}\sum_{i=1}^{n}[y_i\log(\hat{y}_i) + (1 - y_i)\log(1 - \hat{y}_i)] \tag{2}$$

According to the equation and FIG. 3(*a*), it can be seen that the cross-entropy loss needs to classify the features in advance, gather similar features in the adjacent feature space, and at the same time pull away the feature centers of different categories of features. The embedded branch of supervised JDE tracking uses this loss for training, due to the present invention does not use the trajectory annotation of the full dataset, all cannot use the cross-entropy loss. The calculation equation of triplet loss is shown in Equation 3:

$$L_{triplet} = \frac{1}{n}\sum_{i=1}^{n}\max\left(0,\ d\left(x_i, x_+^{(i)}\right) - d\left(x_i, x_-^{(i)}\right) + m\right) \tag{3}$$

The triplet loss does not need to determine the specific category of each feature, it only needs to know whether the several features of the loss calculation are the same category, the triplet loss is more flexible than the cross-entropy loss, but also because there is no clear feature category center as the cross-entropy loss, the effect will decrease, and the sampling strategy will have an extremely huge impact on the effect of the triplet loss, the farthest positive sample and the nearest negative sample are used to replace the random sampling for optimization. According to FIG. 3(*b*), it can be seen that the triplet loss only draws one positive sample and pushes one negative sample away at a time, such a strategy will also affect the effect when the negative sample distribution is more dispersed. The calculation equation of the contrastive loss is shown in Equation 4:

$$L_{contrastie} = \frac{1}{n}\sum_{i=1}^{n}(1 - y_i)d\left(x_i, x_+^{(i)}\right)^2 + y_i\ \max\left(0,\ m - d\left(x_i, x_+^{(i)}\right)\right)^2 \tag{4}$$

According to the equation and FIG. 3(*c*), it can be seen that the contrastive loss does not need to determine the specific category of each feature as the triple loss, which makes the contrastive loss have the flexibility of the triple loss; however, unlike the operation that the triplet only pushes away one negative sample per loss, the contrastive loss will pull away all the negative samples at the same time, which makes the category center of the positive sample pair more clear and makes the feature center points of different categories more evenly dispersed in the feature space. The difficulty of the contrastive loss is that it is necessary to sample a large number of negative samples at the same time to achieve better results, this problem does not exist in the multi-object tracking dataset of dense scenes, different objects in a smaller batch are sufficient to provide sufficient negative samples, so the SSCI module will use the contrastive loss that is more in line with the tracking scene.

Figure 4:
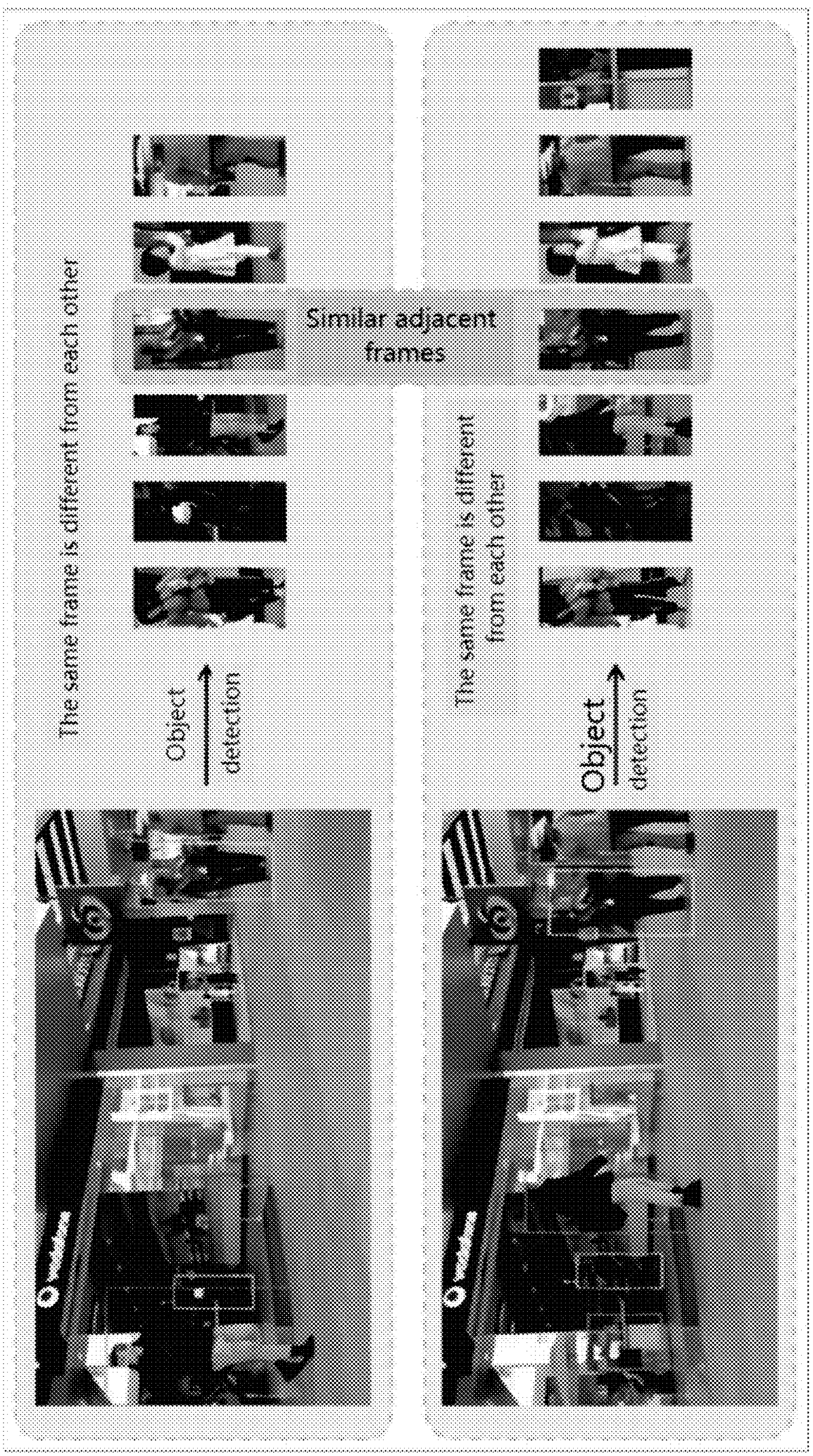
FIG. 4 is a key prior diagram of the present invention.

A constrained SSCI module is formed by using a relation between the interior of a video frame and a relation between adjacent video frame objects; the SSCI module is only a loss calculation module, the motivation and basis of its design are derived from two key prior information, that is, the objects within the same frame must not be the same, and the objects in adjacent frames can obtain matching pairs with high accuracy according to the embedded features. The display of these two priors is shown in FIG. 4;

According to the two prior information shown in FIG. 4, the features of different objects in each frame of the image are mutually set as negative samples, adjacent frame objects with similar adjacent frames (the matching results of adjacent frame ss) are set as positive sample pairs, and contrastive loss is constructed according to the positive sample pairs. The overall structure of SSCI can be seen in FIG. 5. SSCI is a module used only in model training. When using SSCI, the dataset will be different from the aforementioned supervised learning, that is, there is no longer a trajectory annotation y. At this time, the dataset will be denoted as $$\{I, B\}_{t=1}^{N}.$$

meanwhile, in order to use the objects of adjacent frames to construct a positive sample pair, SSCI uses two consecutive frames of images to form a short sub-video segment as the model input. At this time, the data of each sub-video can be expressed as $$\{I, B\}_{i=1}^{\{t,t+1\}}.$$

After inputting these sub-videos into a network, the corresponding feature vectors $\hat{E}_t=\{x_1, x_2 \ldots x_{k_t}\}$ and $\hat{E}_{t+1}=\{x_1, x_2 \ldots x_{k_{t+1}}\}$ can be obtained according to the detection annotations of the frame t and frame t+1; where x denotes a feature vector of a corresponding object, and $k_t$, and $k_{t+1}$ denote a number of objects in the frame image respectively. Since the trajectory annotation cannot be used, the cross-entropy loss cannot be used here to construct a constraint on the embedded features $\hat{E}_t$, so the present invention uses three variant losses based on the self-supervised contrastive loss to constrain, the original form of the self-supervised contrastive loss is shown in Equation 5:

$$L_{selfcontrative} = -\log\left[\frac{e^{sim\left(x_i x_i^{+}\right)/\tau}}{\sum_{j':=i} e^{sim\left(x_i, x_j\right)/\tau}}\right] \tag{5}$$

where sim $(x_i, x_i^{+})$ denotes the cosine similarity between the i-th sample and its positive sample, sim $(x_i, x_j)$ denotes the similarity between the i-th object and the sample other than itself, t is the temperature that controls the constraint degree of the difficult sample. From this equation, it can also be understood that the construction of positive and negative samples is the most important part of contrastive loss.

Figure 5:
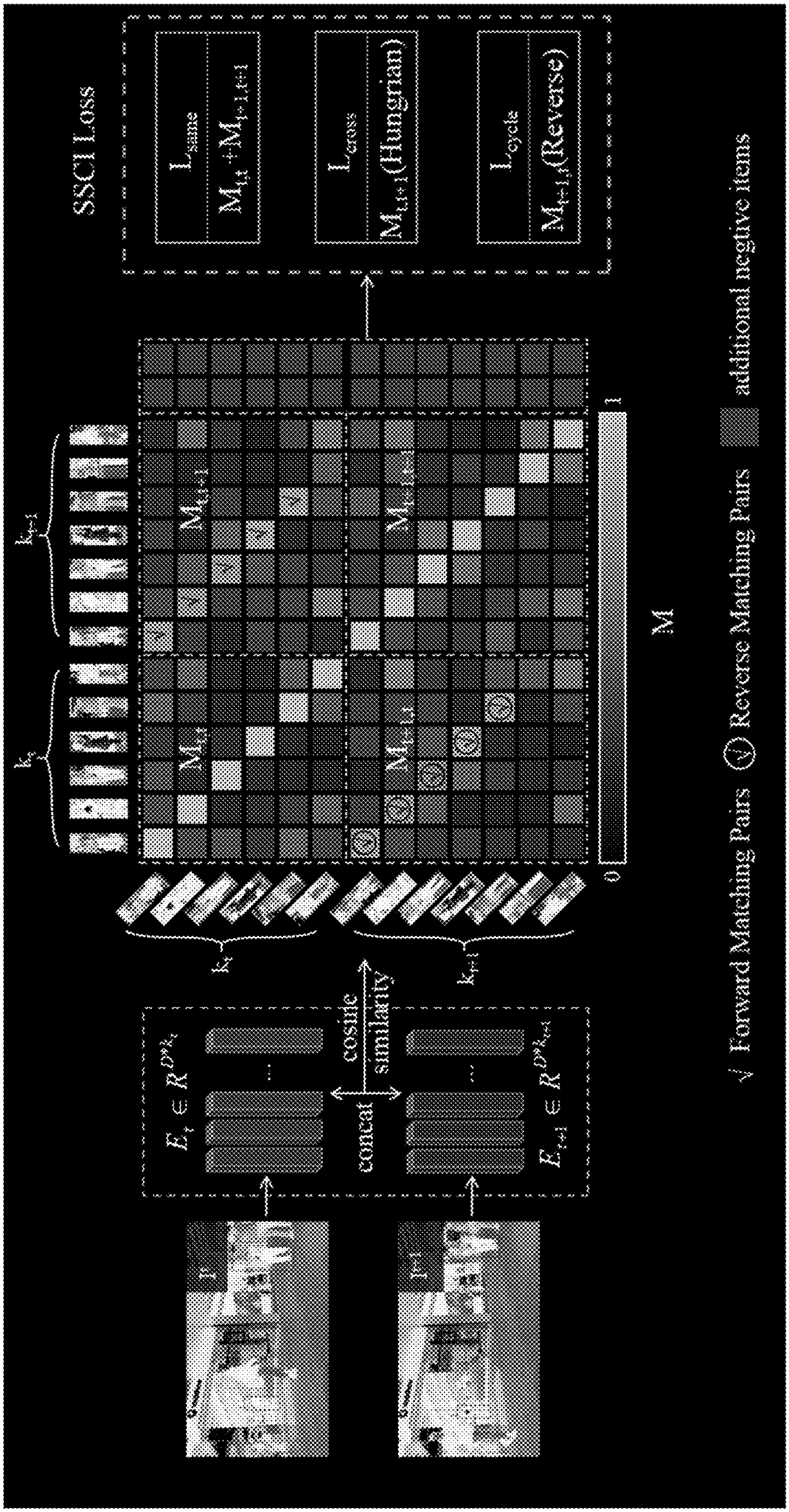
FIG. 5 is an overall frame diagram of the SCI of the present invention.

As shown in FIG. 5, after obtaining $\hat{E}_t$ and $\hat{E}_{t+1}$, they are spliced and the cosine similarity matrix $M \in R^{(k_t+k_{t+1})*(k_t+k_{t+1})}$ between all x is calculated, the corresponding values $m_{i,j}$ of each point in the matrix are calculated by Equation 6:

$$m_{i,j} = \frac{x_i * x_j}{\|x_i\|_2 \|x_j\|_2},\ i, j \in (0,\ k_i + k_{i+1} - 1) \tag{6}$$

The value of $m_{i,j}$ denotes the cosine similarity between the embedding vectors corresponding to the two objects. As shown in FIG. 5, the matrix M can be divided into four sub-matrices. $M_{t,\ t}$ and $M_{t+1,\ t+1}$ denote the similarity between objects in t frame and t+1 frame respectively; the $M_{t,\ t+1}$ and $M_{t+1,\ t}$ denote the similarity between objects in frames t and t+1. Based on the object in the same frame must be a priori of different objects.

For the information condition, the loss function $L_{same}$ for the negative samples in the same frame is first designed, as shown in Equation 7:

$$L_{same} = \sum_{i!=j}^{0 \le i,j \le k_t - 1} \frac{e^{m_{i,j}/\tau}}{\sum_{l!=i}^{k_t + k_{t+1} + 1} e^{m_{i,l}/\tau}} + \sum_{i!=j}^{k_t \le i,j \le k_t + k_{t+1} + 1} \frac{e^{m_{i,j}/\tau}}{\sum_{l!=i}^{k_t + k_{t+1} + 1} e^{m_{i,l}/\tau}} \tag{7}$$

the denominator of the first term of $L_{same}$ is the sum of all elements except pairs in $M_{t,\ t}$, which tends to pull away the distance between all object features in frame t. The second term is the same operation on $M_{t+1,\ t+1}$. The denominators of these two terms are consistent with the denominator of the contrastive loss, but the molecule of the contrastive loss is the similarity between the positive sample pairs, and there can be no positive samples in the same frame image. Therefore, $L_{same}$ retains the operation similar to softmax in the contrastive loss, and replaces the similarity of the positive sample pair in the molecule with the similarity of the negative sample pair, meanwhile, log operation and negative operation are no longer performed to ensure that the optimization direction of the loss is consistent with the direction in which the negative sample distance becomes larger. In fact, for $L_{same}$, there is a simpler constraint that is easier to think of, that is, the direct addition of the values of the non-diagonal lines in $M_{t,\ t}$ and $M_{t+1,\ t+1}$ is regarded as a loss, but the result obtained by this simple constraint is not good.

The first loss $L_{same}$ only acts on objects in the same frame and does not establish constraints on cross-frame objects, which is the most important ability required for tracking tasks. Therefore, SSCI uses the Hungarian algorithm in $M_{t,\ t+1}$ as the forward matching of the frame t object to the frame t+1 object to obtain the matching pair of the same object in the adjacent frames, that is, the Hungarian operation of the $L_{cross}$ in FIG. 5. These matching pairs will be regarded as positive pairs, and the second loss $L_{cross}$ is calculated according to Equation 8. The equation is as follows:

$$L_{cross} = \sum_{i,j \in matched} -\log\left(\frac{e^{m_{i,j}/\tau}}{\sum_{l!=i}^{k_i + k_{i+1} - 1} e^{m_{i,j}/\tau}}\right) \tag{8}$$

the $L_{cross}$ is calculated in the same way as the self-supervised contrastive loss, which aims to narrow the similarity of matching pairs between adjacent frames. The matching operation in $L_{cross}$ is interpreted as forward tracking, meanwhile, it is proposed that the forward tracking result should be consistent with the reverse tracking result, the reverse tracking uses the object of the subsequent frame to match the object of the first frame. In order to ensure this consistency, this section proposes a third loss function $L_{cycle}$ which is calculated as shown in Equation 9:

$$L_{cycle} = \sum_{i,j \in matched} 1 - \frac{e^{m_{j+i,i}/\tau}}{\sum_{l!=j+i}^{k_i + k_{i+1} - 1} e^{m_{j+i,l}/\tau}} \tag{9}$$

$L_{cycle}$ acts on the elements in $M_{t+1,t}$, which uses the forward matching pairs as the reverse matching pair, and does not use the additional matching operation, that is, the reverse operation of $L_{cycle}$ in FIG. 5. This can further narrow the distance between the features of the matching pairs. SSCI defines the loss of the embedded branch as the sum of the above three losses, namely:

$$L_{ID} = L_{same} + L_{cross} + L_{cycle} \tag{10}$$

meanwhile, since the number of negative samples is critical to the contrastive loss, SSCI will sample the object box from different scenes in the same batch as an additional negative sample. The negative samples are spliced in $\hat{E}_{t+1}$, and then calculated $M' \in R^{(k_t+k_{t+1})*(k_t+k_{t+1}+k_t)}$: to replace the original M for subsequent loss calculation.

2 Experiment and Analysis 2.1 Training Datasets and Metrics the present invention will use the MOT Challenge dataset, comprising MOT17 and MOT20. The MOT17 dataset comprises a training set and a testing set, the training set contains 5316 frames of images from 7 videos, and the testing set also contains 7 videos and a total of 5919 frames. MOT20 is a denser dataset than the MOT17 object, wherein the training set accounts for 4 videos and 8931 frames of images, and the testing set accounts for 4 videos and 4479 frames of images. In this section, in addition to the test experiment, the remaining experiments use the first half of the MOT17 data as the training set and the second half of the data as the verification set for the experiment. In the experiment of the testing set, it will be consistent with JDE, FairMOT and Cstrack, using additional CrowdHuman, ETH, CityPersons, CalTech, CUHK-SYSU and PRW datasets.

In terms of evaluation metrics, the present invention will use standard MOT Challenge evaluation metrics, and focus on MOTA, IDF1, MT (Mostly Tracked objects), ML (Mostly Lost objects), IDS (Number of Identity Switches) metrics.

2.2 Training Details and Parameter Settings

In order to ensure the adequacy of the experiment, the present invention applies unsupervised training on FairMOT, Cstrack and OMC for corresponding effect comparison. Meanwhile, in order to ensure the fair comparison, the present invention will maintain the hyperparameters of these network standards. Both Cstrack and OMC will use the SGD optimizer to train 30 rounds. The learning rate is initialized to $5*10^{-4}$ and attenuated to $5*10^{-5}$ in 20 rounds. The weight of detection loss and embedding loss also uses the 1:0.02 in the original paper. FairMOT uses the Adam optimizer to train 30 rounds, and the learning rate is set to $1*10^{-4}$, the detection loss and embedding loss use learnable weights. All training on the present invention will be carried out in a Tesla V100 GPU. Consecutive frames in unsupervised training will be randomly selected from 10 frames before and after the first frame according to the video frame rate.

2.3 Validation Experiment

The present invention will carry out all the validation experiments mentioned above. That is to verify the above: 1) the features extracted by using randomly initialized embedded branches can still distinguish objects in short-interval frames; 2) $L_{same}$ uses simple addition as a loss, and the effect of using triple loss instead of contrastive loss on the experiment; 3) the validation competition problem still exists in the Cstrack using the CCN module.

The key prior that the randomly initialized embedded branch can still obtain a certain effect of embedded features when the interval between two frames is small will be the premise that $L_{cross}$ can operate. In order to verify this prior, the present invention uses randomly initialized features of the embedded branch output to simulate the tracking, and uses these features to match to see the correct rate.

Figure 6:
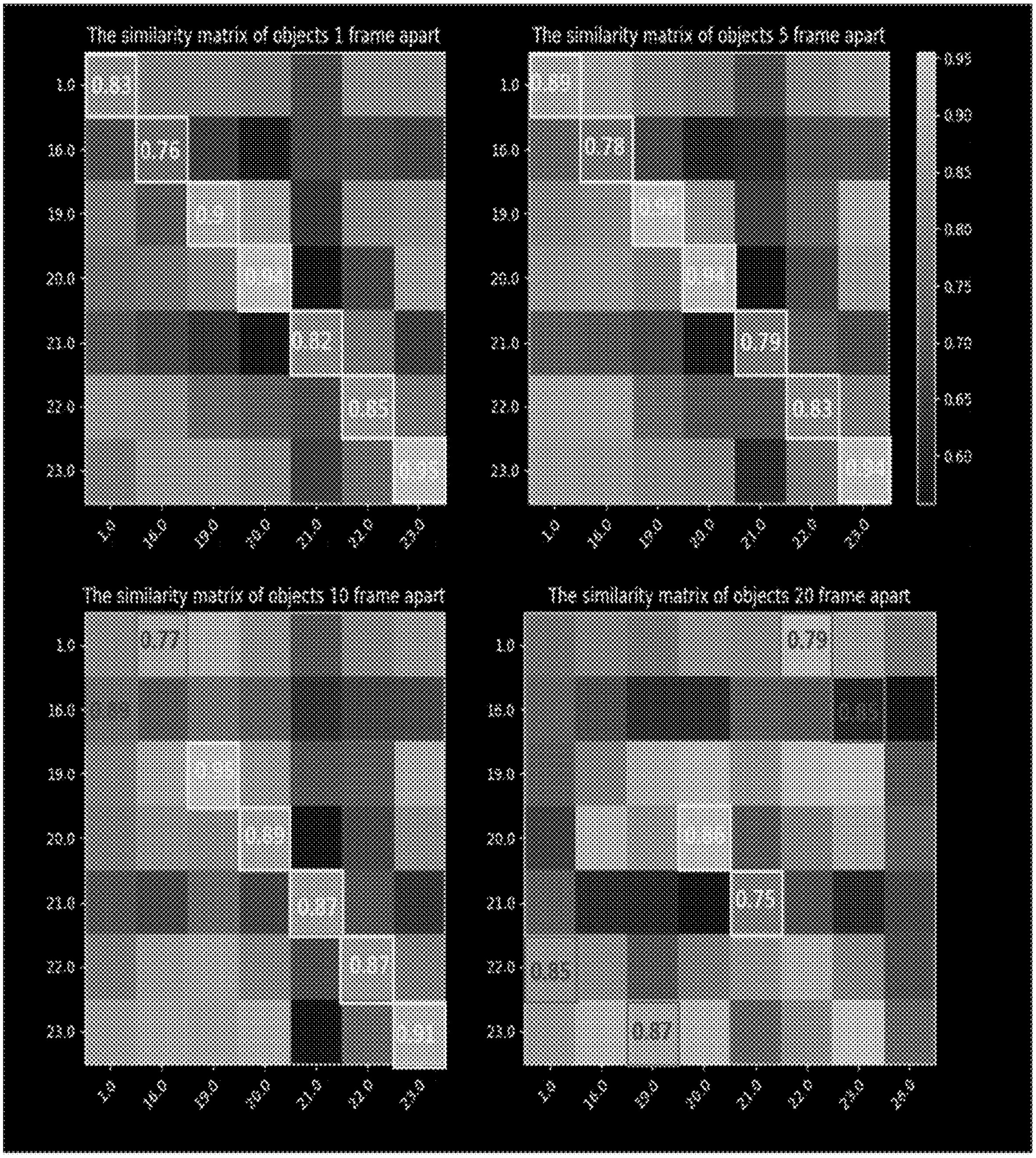
FIG. 6 is a simulated tracking structure diagram of the present invention.

Specifically, the $28^{th}$ frame image in the MOT17-09 sequence along with its subsequent 1 frame, 5 frame, 10 frame, and 20 frame images into a network loaded with only coco pretrained weights (because the pretrained is only for the detection branch, the embedded branch is randomly initialized at this time), the similarity matrix M of the embedded features is calculated, and the Hungarian algorithm is used for matching according to the similarity, and the results are shown in FIG. 6. It is proved that the untrained embedded branch can still provide effective features when the selected image interval is short, and this effectiveness will decrease as the interval increases. Therefore, in order to ensure that the matching pair with high accuracy can be found during training, the subsequent experiments will randomly select the second frame from within 10 frames before and after the first frame.

It is also necessary to verify the effect of replacing Equation 7 with Equation 3 and Equation 11 on the experiment.

$$L_{same} = \sum_{j!=1}^{0\le i,j\le k_t-1} m_{i,j} + \sum_{j!=i}^{k_t\le i,j\le k_{t+1}+k_t-1} m_{i,j} \tag{11}$$

Figure 7:
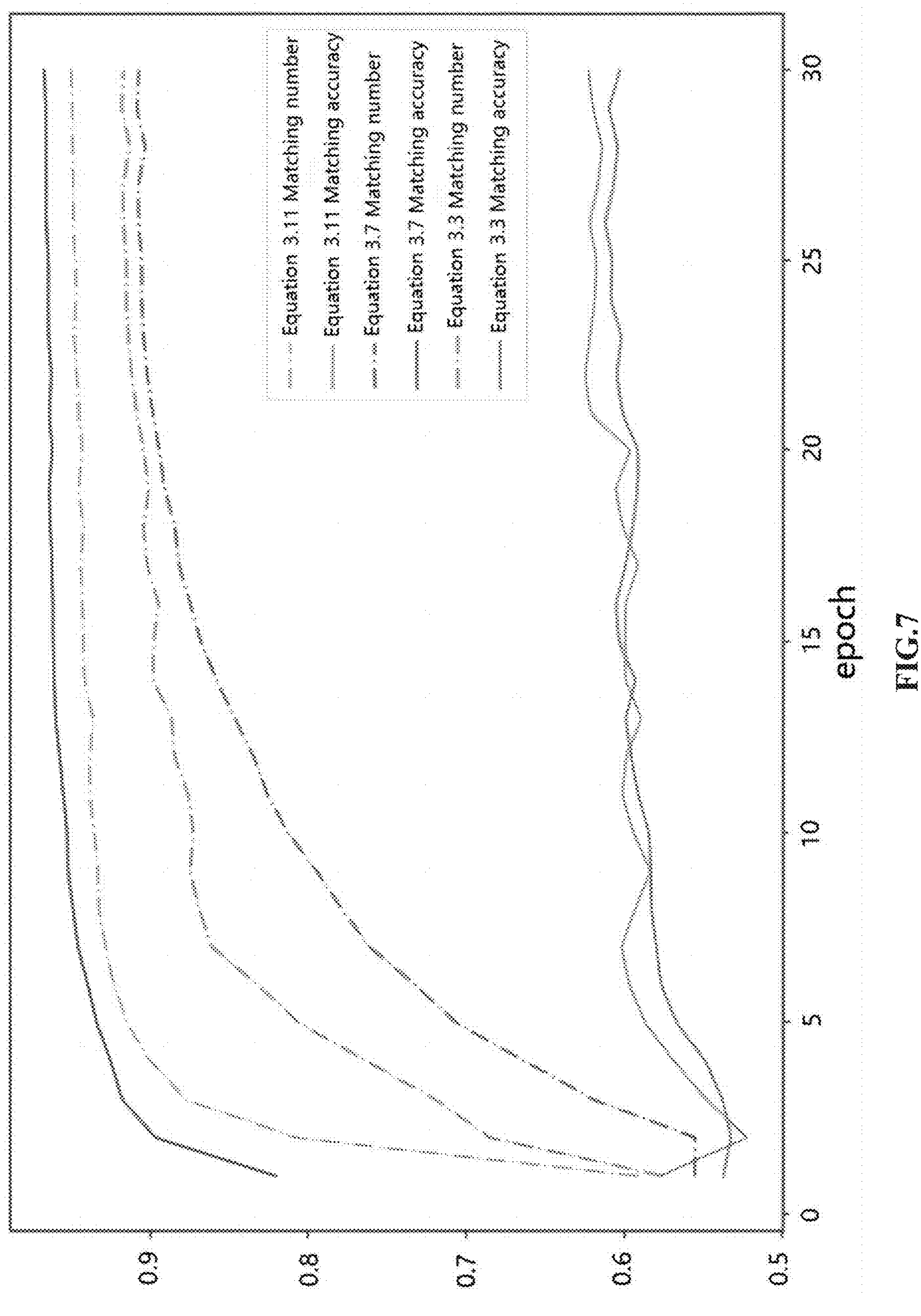
FIG. 7 is a schematic diagram of the effect of the three losses of the present invention on the matching results during training.

FIG. 7 shows the average value of the number of matching pairs and the matching accuracy obtained by each iter before $L_{cross}$ in the whole epoch when using these three loss training. The number and accuracy of matching pairs are crucial to the constraints of adjacent frames, so the influence of intra-frame loss on matching pairs can reflect its influence on the training effect to a certain extent.

From FIG. 7, it can be found that using Equation 7 can maintain a relatively high matching accuracy, and the number of matching increases steadily with the increase of training rounds; using Equation 11 can quickly achieve a higher number of matches, but its accuracy is difficult to guarantee; using Equation 3 will result in an increasing number of matches, but the matching accuracy rate has not increased significantly. The present invention believes that the reason for this result is that although Equation 7 does not directly use the information of adjacent frame objects as a loss, it uses the information of adjacent frames as softmax, which makes the similarity of the negative samples in the current frame tend to 0 while maintaining the stability of the object features of adjacent frames. However, Equation 3 and Equation 11 only consider pushing away the features of the current intra-frame object, which results in no correlation between the features of the two frames and reduces the correlation. Therefore, $L_{same}$ finally chose to use Equation 7. Both Cstrack and FairMOT mention the problem of branch competition and give corresponding solutions.

In order to verify whether the competition problem continues to exist, the present invention makes a simple experiment. As shown in Table 1, the first two rows are the results of Cstrack's untrained embedded branch and trained embedded branch, respectively, and the last two rows are the results of the FairMOT pair. Because the IDF1 metric is more responsive to the tracking effect, and the MOTA is more responsive to the detection effect, the present invention lets the IDF1 denote the tracking effect and the MOTA denote the detection effect. From Table 1, it can be seen that training the embedded branch can indeed greatly improve the tracking effect.

TABLE 1

Effect of trained/untrained embedded branch on the metrics

| Method | MOTA↑ | IDF1↑ | FN ↓ | FP↓ | IDS↓ |
|---|---|---|---|---|---|
| $Cstrack_{w/o}$ | 59.8% | 61.9% | 16800 | 4208 | 640 |
| Cstrack | 58.5%(−1.3%) | 67.0%(+5.1%) | 17687 | 4041 | 622 |
| $FairMOT_{w/o}$ | 68.9% | 66.5% | 13015 | 3162 | 618 |
| FairMOT | 67.7%(−1.2%) | 70.3%(+3.8%) | 14271 | 2763 | 548 |

2.4 Embedded Branch Unsupervised Contrastive Loss Module Ablation Experiment and Parameter Experiment The present invention will conduct ablation research from three kinds of losses, negative sample number, difficult sample temperature and training matching threshold respectively, and display the visualization results. All experiments involved in the present invention will be implemented based on FairMOT.

Firstly, the ablation of SSCI is studied.

SSCI consists of three sub-losses: $L_{same}$ is responsible for pulling away the features of the same intra-frame object; $L_{cross}$ is responsible for drawing closer the difference between the positive sample pairs with successful matching of adjacent frames; $L_{cycle}$ is responsible for ensuring that the forward and reverse matching results are consistent.

Table 2 shows the effect of using each loss in the validation set, where the result of the fourth row is the effect of supervised training. It can be seen from Table 2 that only using $L_{same}$ can achieve a similar effect as supervision. After adding $L_{cross}$ and $L_{cycle}$, IDF1 is significantly improved and IDS is reduced, that is, the effect of the embedded branch is improved, but it also causes a decline in recall (FN decline) and a decline in MOTA., the present invention believes that this result is caused by the competition between the embedded branch and the detection branch.

Since both $L_{cross}$ and $L_{cycle}$ are based on contrastive loss, the number of negative samples will have a greater impact on the effect of contrastive loss, so the present invention studies the number of negative samples. $L_{cross}$ and $L_{cycle}$ are both constraints on the positive sample pairs that are successfully matched, so the remaining objects in the current two frames can be naturally regarded as negative samples, meanwhile, because the MOT17 dataset is composed of multiple video segments, the objects of different videos can be considered to be different, so the present invention fills the objects of different videos in the same batch as negative samples. Here, the negative samples filled from different video segments are regarded as additional negative samples, and the number of these additional negative samples is analyzed. Table 3 shows the effect of FairMOT when using different numbers of negative samples, where $N_t$ is the number of objects in the first frame. It can be found from Table 3 that more negative samples can generally bring higher IDF1, but at the same time reduce MOTA, therefore, in order to balance the most critical MOTA and IDF1 metrics, SSCI finally chose $N_{neg}/N_t=2$.

TABLE 2

]Ablation experiments of three kinds of losses

| $L_{same}$ | $L_{cross}$ | $L_{cycle}$ | MOTA↑ | IDF1↑ | MT↑ | ML↓ | FN ↓ | FP↓ | IDS↓ |
|---|---|---|---|---|---|---|---|---|---|
| √ | | | 67.7% | 70.1% | 138 | 52 | 13665 | 3182 | 589 |
| √ | √ | | 67.6% | 71.0% | 142 | 59 | 14189 | 2813 | 471 |
| √ | √ | √ | 67.5% | 71.4% | 137 | 60 | 14453 | 2625 | 462 |
| x | x | x | 67.7% | 70.3% | 135 | 62 | 14271 | 2763 | 548 |

TABLE 3

Related experiments on the number of additional negative samples

| $N_{neg}/N_t$ | MOTA↑ | IDF1↑ | FN ↓ | FP↓ | IDS↓ |
|---|---|---|---|---|---|
| 0 | 66.8% | 70.8% | 14702 | 2802 | 458 |
| 0.5 | 67.5% | 70.8% | 14449 | 2617 | 485 |
| 1 | 66.8% | 71.0% | 14685 | 2821 | 442 |
| 1.5 | 67.0% | 70.5% | 14657 | 2664 | 505 |
| 2 | 67.5% | 71.4% | 14453 | 2625 | 462 |
| 3 | 66.9% | 71.2% | 14589 | 2791 | 499 |

The self-supervised contrastive loss uses a temperature to control the weight of difficult samples (see Equation 5, Equation 7, Equation 8 and Equation 9), sets the temperature to 0.5, and mentions that this value will have different optimal values according to different tasks, therefore, the present invention compares the effects of different fixed T values in Table 4 and adds the effect comparison of adaptive T values. It can be seen from the results in the table that T=2 can still achieve the best results at a fixed value, but the T obtained dynamically can achieve the best results according to the number of objects, so the T of SSCI will be set to $T=\frac{1}{2}(\log(N_t+N_{t+1}+1))$.

TABLE 4

Related experiments of T value of difficult samples

| T | MOTA↑ | IDF1↑ | FN ↓ | FP↓ | IDS↓ |
|---|---|---|---|---|---|
| 1 | 67.2% | 68.3% | 13835 | 3306 | 583 |
| ½ | 67.4% | 70.1% | 13718 | 3343 | 542 |
| ⅓ | 66.4% | 69.5% | 14266 | 3341 | 549 |
| ¼ | 66.5% | 68.7% | 14314 | 3260 | 535 |
| ⅕ | 66.8% | 70.2% | 14063 | 3381 | 504 |
| $\frac{1}{2}(\log(N_t + N_t + 1 + 1)$ | 67.5% | 71.4% | 14453 | 2625 | 462 |

TABLE 5

Hungarian algorithm linear allocation threshold related experiments

| Linear allocation threshold | MOTA↑ | IDF1↑ | FN ↓ | FP↓ | IDS↓ | $N_{match}$↑ | $N_{right}$↑ |
|---|---|---|---|---|---|---|---|
| 0.8 | 66.9% | 70.7% | 14255 | 3096 | 512 | 0.78 | 0.97 |
| 0.7 | 67.5% | 71.4% | 14453 | 2625 | 462 | 0.89 | 0.96 |
| 0.6 | 66.5% | 71.2% | 14646 | 2979 | 470 | 0.94 | 0.90 |

Since $L_{cross}$ and $L_{cycle}$ need to use the linear matching of the Hungarian algorithm to construct positive sample pairs during training, the threshold in the Hungarian algorithm will inevitably affect the correctness and number of pairs, thus affecting the final effect. The present invention compares the effects of using different thresholds in Table 5, where $N_{match}$ and $N_{right}$ denote the proportion of the number of matching successes in the last epoch of training to the total number of objects and the proportion of the number of matching corrects to the number of matching successes respectively. It can be found from the table that higher thresh will lead to a significant reduction in the number of successful matches, but will not increase the accuracy rate too high, while lower thresh will increase the number of matches and reduce the accuracy rate. According to the experimental results, SSCI finally chose thresh=0.7.

Finally, a series of visual presentations of the features generated by the embedded branches trained using SSCI are made to show the effect comparable to supervised learning.

Firstly, the present invention uses the feature heat map response diagram to demonstrate the discriminative ability of the features obtained by unsupervised embedding training. FIG. 8B, shows a frame randomly selected from the validation set, and then extracts its subsequent 1, 5, 10 and 20 frames of images in turn. The first frame contains the query instance, and the subsequent extracted frames contain the object instance with the same ID. The heat map response diagram is obtained by calculating the cosine similarity between the embedded features of the query instance and the output feature map of the entire embedded branch of the subsequent frame.

Figure 8A:
FIG. 8A, FIG. 8B and FIG. 8C are visual heat maps of the present invention.
Figure 8B:
Figure 8C:

FIG. 8A and FIG. 8C show the heat map response diagram of the tracking object and the subsequent 1, 5, 10 and 20 frames shown in FIG. 8B, respectively. The features in FIG. 8A come from the FairMOT of SSCI training, while the features in FIG. 8C come from the FairMOT of supervised training. From FIG. 8A and FIG. 8C, it can be seen that the heat map with an interval of 1 frame has a wrong high response on adjacent pedestrians, whether supervised or unsupervised, but from the heat map with a longer interval, it can be seen that all the positions in the heat map of supervised training with similar color information to the selected object have a higher wrong response, so it can be inferred that the features of supervised training are more likely to focus on color information. Meanwhile, the model trained by SSCI only has low response values in these error positions, while it has high response values in the real position. This proves the effectiveness of SSCI.

2.5 Comparative Analysis of Test Set Effect

Table 6 lists the results of the multi-object tracking algorithm trained by the present invention compared with the current advanced supervised and unsupervised tracking algorithms on the MOT17 dataset. It can be seen that the present invention can obtain similar performance with its corresponding supervision method on the main tracking metrics. It is an available training mode to obtain a similar effect as the supervised method without using trajectory annotation. Compared with other unsupervised algorithms, only OUTrack uses additional supervised signals to achieve better results than the present invention, this result proves that the present invention is close to the best in unsupervised tracking methods. Table 7 lists the results of the multi-object tracking algorithm trained by the present invention compared with the current advanced supervised and unsupervised tracking algorithms on the MOT20 dataset.

TABLE 6

Comparison of MOT17 test set results

| Method | Source | unsupervised | MOTA↑ | IDF1↑ | FN ↓ | FP↓ | IDS↓ |
|---|---|---|---|---|---|---|---|
| Visual-Spatial | NIPS202 | √ | 56.8% | 58.3% | 231K | 12K | 1K |
| Unsuper Track | Arxiy202C | √ | 61.7% | 58.1% | 197632 | 16872 | 1864 |
| SSAT | Arxiv2020 | √ | 62.0% | 62.6% | 197670 | 14970 | 1850 |
| CenterTrack | ECCV2020 | √ | 61.5% | 59.6% | 200672 | 14076 | 2583 |
| Semi-TCL | Arxiv2021 | √ | 73.3% | 73.2% | 124980 | 22944 | 2790 |
| OUTrack | Neural Computing 2022 | √ | 73.5% | 70.2% | 110577 | 34764 | 4110 |
| FairMOT | IJCV2021 | x | 73.7% | 72.3% | 117477 | 27507 | 3303 |
| Cstrack | TIP2023 | x | 70.6% | 71.6% | 137832 | 24804 | 3465 |
| OMC | AAAI2022 | x | 76.3% | 73.8% | 101022 | 28894 | — |
| FairMOT(ours) | | √ | 72.5% | 70.7% | 103479 | 34674 | 4374 |
| Cstrack(ours) | | √ | 70.0% | 70.6% | 141534 | 19619 | 3348 |
| OMG(ours) | | √ | 75.5% | 72.7% | 109806 | 24555 | 5436 |

TABLE 7

Comparison of MOT20 test set results

| Method | Source | unsupervised | MOTA ↑ | IDF1↑ | FN ↓ | FP↓ | IDS↓ |
|---|---|---|---|---|---|---|---|
| Semi-TGL | Arxiv2020 | √ | 65.2% | 70.1% | 144358 | 61209 | 4139 |
| OUTrack | Neural Computig 2022 | √ | 68.5% | 69.4% | 123197 | 37431 | 2147 |
| FairMOT | IJCV2021 | x | 68.1% | 71.1% | 131380 | 30503 | 3019 |
| OMC | AAAI2022 | x | 70.7% | 67.8% | 125039 | 22689 | — |
| Cstrack | TIP2023 | x | 66.6% | 68.6% | 144358 | 25404 | 3196 |
| FairMOT(ours) | | √ | 66.7% | 69.9% | 124272 | 43693 | 4234 |
| OMC(ours) | | √ | 69.3% | 65.9% | 119643 | 32315 | 4524 |
| Cstrack(ours) | | √ | 65.4% | 67.3% | 128249 | 34273 | 4721 |

2.6 Visualization Results

Figure 9:
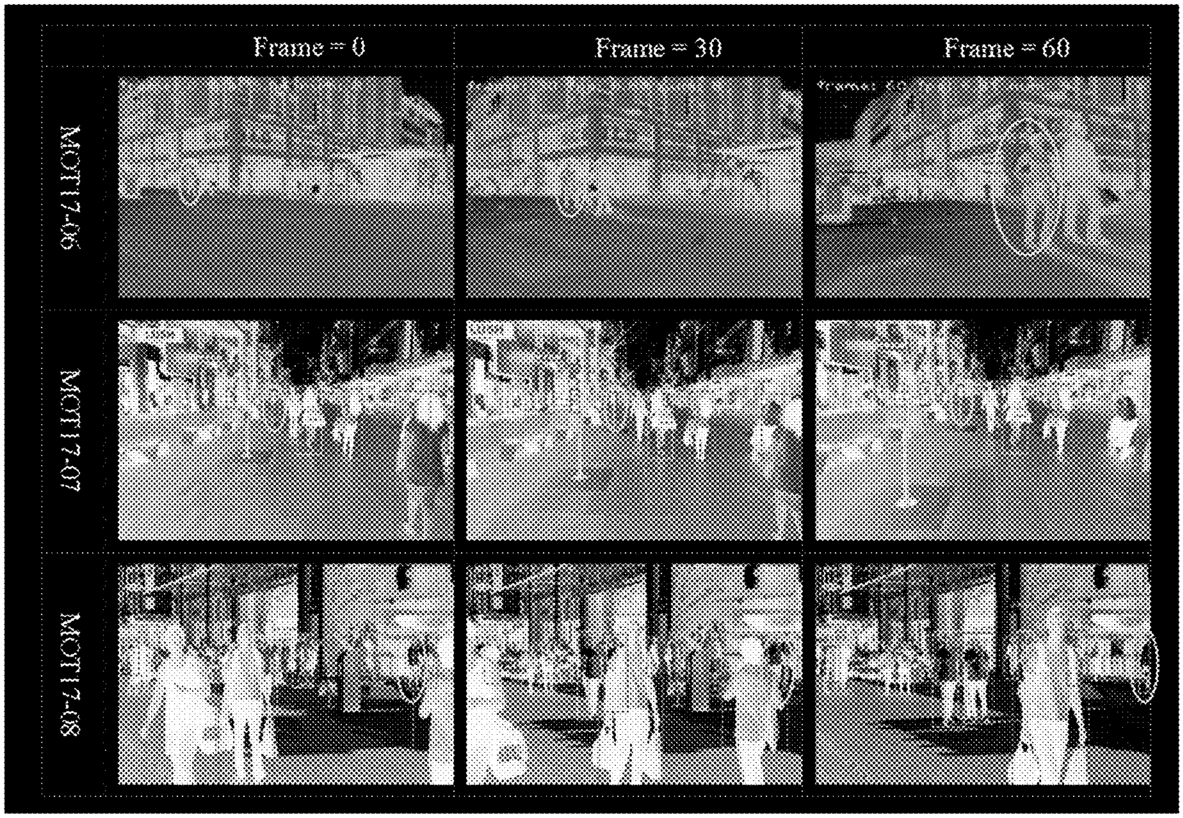
FIG. 9 is a visual schematic diagram of a MOT17 testing set tracking the effect of the present invention.

FIG. 9 shows the tracking situation of the present invention in three different scenes on the MOT17 test set, each row in the picture denotes a different scene, and uses the present invention to track and take out the results at intervals of 30 frames as shown in the picture of each row, it can be seen from the figure that even for small objects at a long distance, the present invention can still perform long-term tracking better.

The preferred embodiments of the present invention disclosed above are intended only to help illustrate the present invention. The preferred embodiment does not set forth all the details in detail, nor does it limit the present invention to the specific embodiment described. Obviously, many modifications and variations are possible in light of the above specification. The embodiments were chosen and described in specification in order to better explain the principles of the present invention and its practical application, so that the technical personnel in the technical field can well understand and use the present invention. The present invention is only limited by the claim and its full scope and equivalent.

What is claimed is:

1. A contrastive loss based training strategy for unsupervised multi-object tracking, comprising:

S1: forming a constrained Self-Supervised Contrastive ID (SSCI) module by using a relation between an interior of a video frame and a relation between adjacent video frame objects;

S2: mutually setting as negative samples according to features of different objects in each frame of an image, setting adjacent frame objects with similar adjacent frames as positive sample pairs, and constructing a contrastive loss based on the positive sample pairs and the negative samples;

S3: constraining an embedded feature $\hat{E}_t$ by using the SSCI module; wherein the SSCI module calculates a loss function $L_{ID}$ comprising a sum of a first loss function $L_{same}$, a second loss function $L_{cross}$, and a third loss function $L_{cycle}$; and wherein $L_{same}$ is configured to pull away distances between features of different objects within a same frame, $L_{cross}$ is configured to narrow a similarity of matching pairs between adjacent frames based on a result of forward matching, and $L_{cycle}$ is configured to ensure a consistency between the result of forward matching and a result of reverse matching;

S4: enhancing a cross-frame expression ability of features by the result of forward matching and the result of reverse matching; and S5: verifying a tracking accuracy by a Multiple Object Tracking (MOT) Challenge dataset.

2. The contrastive loss-based training strategy for unsupervised multi-object tracking according to claim 1, wherein the constrained SSCI module is calculated according to following: objects within a same frame must not be same; and objects of adjacent frames are matched pairs with higher correctness based on the embedded features.

3. The contrastive loss based training strategy for unsupervised multi-object tracking according to claim 1, wherein the positive sample pairs are constructed by the adjacent frame objects, and steps are as follows: using two consecutive frames to form a short sub-video segment as a model input, and at this time, data of each short sub-video segment is expressed as $$\{I, B\}_{i=1}^{\{t,t+1\}},$$

wherein I denotes a frame image, B denotes a position of an object in a current frame image, t denotes a frame t, and t+1 denotes a frame t+1.

4. The contrastive loss based training strategy for unsupervised multi-object tracking according to claim 3, wherein after inputting these sub-videos into a network, corresponding feature vectors $\hat{E}_t=\{x_1, x_2 \ldots x_{k_t}\}$ and $\hat{E}_{t+1}=\{x_1, x_2 \ldots x_{k_{t+1}}\}$ are obtained according to detection annotations of a frame t and a frame t+1; wherein x denotes a feature vector of a corresponding object, and $k_t$ and $k_{t+1}$ denote a number of objects in a frame image respectively.

5. The contrastive loss based training strategy for unsupervised multi-object tracking according to claim 1, wherein a cross-frame expression ability of features is enhanced by the forward matching and the reverse matching, and steps are as follows: a matrix M is divided into four sub-matrices: $M_{t,t}$ and $M_{t+1,t+1}$ and $M_{t,t+1}$ and $M_{t+1,t}$; wherein $M_{t,t}$ and $M_{t+1,t+1}$ denote a similarity between objects in the frames t and t+1 respectively; the $M_{t,t+1}$ and $M_{t+1,t}$ denote a similarity between objects in the frames t and t+1; SSCI uses a Hungarian algorithm in $M_{t,t+1}$ as the forward matching of a $t^{th}$ frame object to a $t+1^{st}$ frame object to obtain a matching pair of a same object in adjacent frames; a loss function $L_{cycle}$ acts on elements in $M_{t+1,t}$, and forward matching pairs are used as a reverse matching pair.

6. The contrastive loss based training strategy for unsupervised multi-object tracking according to claim 1, wherein the MOT Challenge dataset comprises a MOT17 dataset and a MOT20 dataset; the MOT17 dataset comprises a training set and a testing set, wherein the training set of the MOT17 dataset contains 5316 frames of images from 7 videos, and the testing set of the MOT17 dataset also contains 7 videos and a total of 5919 frames; and wherein the MOT20 dataset comprises a training set and a testing set, wherein the training set of the MOT20 dataset accounts for 4 videos and 8931 frames of images, and the testing set of the MOT20 dataset accounts for 4 videos and 4479 frames of images.

7. The contrastive loss-based training strategy for unsupervised multi-object tracking according to claim 6, wherein a ratio of the training set and the testing set of the MOT17 dataset is 5:5.

* * * * *